United States Patent [19]

Pilgrim

[11] 4,224,078

[45] Sep. 23, 1980

[54] TREATMENT OF GYPSUM PLASTER

[75] Inventor: Thomas A. Pilgrim, Edwalton, England

[73] Assignee: BPB Industries Limited, London, England

[21] Appl. No.: 973,919

[22] Filed: Dec. 28, 1978

Related U.S. Application Data

[63] Continuation-in-part of Ser. No. 819,150, Jul. 26, 1977, abandoned.

[30] Foreign Application Priority Data

Jul. 26, 1976 [GB] United Kingdom .............. 31113/76
Oct. 21, 1976 [GB] United Kingdom .............. 43773/76

[51] Int. Cl.² ............................................. C04B 11/00
[52] U.S. Cl. .................................................. 106/110
[58] Field of Search ................ 106/109, 110; 423/555

[56] References Cited

U.S. PATENT DOCUMENTS 2,285,098   6/1942   Schoch et al. ..................... 106/109

*Primary Examiner*—James Poer
*Attorney, Agent, or Firm*—Birch, Stewart, Kolasch and Birch

[57] ABSTRACT

The present invention is directed to the preparation of gypsum plaster prepared from gypsum rock having a substantial salt content to render it more suitable for manufacturing processes such as the manufacture of gypsum board by rapid and intimate mixing with a flow of water followed by rapid separation of the bulk of the water, the recovered purified wet or damp plaster being used at once in the manufacturing process before an unacceptable degree of hydration has occurred. It is preferred to use for the washing cold water, say up to 40° C. and to add no retarder or other additive at the washing stage in order to minimize cost and avoid interference with the subsequent manufacturing process. The time elapsing between contacting the plaster with water and recovery of wet purified plaster preferably does not exceed 30 seconds. A rotary or vortical mixer may be used and the preferred means for rapid separation is a continuous decanting centrifuge having a cone angle not exceeding 7°.

6 Claims, 4 Drawing Figures

TREATMENT OF GYPSUM PLASTER

CROSS REFERENCE TO RELATED APPLICATION

The present application is a continuation-in-part of co-pending application Ser. No. 819,150 filed July 26th 1977 now abandoned

BACKGROUND OF THE INVENTION

1. Field of the Invention

This invention relates to the treatment of gypsum plaster, more especially for the purposes of utilization in the production of set gypsum products, more particularly plaster or gypsum board.

2. Description of the Prior Art

Gypsum rock, as it occurs naturally, has a variable content of soluble salts, notably including chloride, sulphate, magnesium and sodium ions. This salt content is carried in over the plaster produced by calcination of such rock and can give rise to problems in the manufacture of gypsum board and like products.

For this reason many deposits of gypsum cannot be used to provide the plaster for gypsum board, although attempts have been made to leach the salt out of the mined gypsum, for example by storing the gypsum in lagoons prior to calcination. This, however, incurs the cost of drying prior to calcination.

While gypsum, calcium sulphate dihydrate, can be immersed in water for prolonged periods without significant chemical change, the cementitious, dehydrated forms, herein referred to as "plaster", and more especially the hemihydrate, react with water below their respective transition temperatures to re-form the hydrated compound. Since a substantially rehydrated material will not set to form a cast product, or will yield only a set product of very low strength, it is clear that the washing of gypsum plaster in its dehydrated forms with water faces a fundamental problem, of avoiding unacceptable hydration during the washing process.

One way of avoiding hydration is to conduct the washing operation above the transition point, as in the production of so-called autoclave plaster or in the formation of by-product gypsum in phosphoric acid production, where the calcium sulphate is precipitated in hemihydrate form. However, the cost of heating the large volumes of water necessary for washing the plaster employed in large-scale manufacture, for example of plasterboard, makes this solution of the problem uneconomic.

British Pat. Nos. 1,127,397 (Bird Machine Company) and 1,190,014 (Imperial Chemical Industries) are examples of the use of continuous hot centrifugation to separate liquid from suspensions of calcium sulphate hemihydrate without setting or hydration, although in either case is this done subsequent to a washing or leaching operation. In the first patent a slurry of hemihydrate is discharged from an autoclave into the centrifuge at about the atmospheric boiling point of water and the solids discharge compartment of the centrifuge casing is also maintained above the inversion temperature. In the latter patent a similar slurry is dewatered in a centrifuge in which all the surfaces on which hemihydrate is liable to be deposited are maintained at a temperature of at least 100° C.

Schoch et al in U.S. Pat. No. 2,285,098 discloses that although below the inversion temperature, hydration will occur, it may not be sufficiently rapid to prevent successful filtration and washing of the hemihydrate. He teaches, however, that the temperature should not fall to any extent below 80° C. in order to give ample time for these operations.

Hydration can also be delayed by the addition of a setting retarder, so allowing more time for the washing process without an undesirable degree of hydration, but not only is the use of a retarder more costly in itself, but also has the disadvantage that the setting of the final cast product is correspondingly affected. This is particularly undesirable in continuous production processes, such as plasterboard manufacture, where rapid setting is desirable in order to shorten the length of the production lines. Accelerators can be used to increase the setting rate, but their use to offset a decrease in setting rate brought about by a setting retarder adds yet another undesirable element of cost.

SUMMARY AND OBJECTS OF THE INVENTION

It has now been found that when calcined gypsum plaster, in its conventional dry particulate form, is added to water it rapidly releases soluble salts into the water and that it is possible to secure this release and to separate off the bulk of the contaminated water by rapid handling before an unacceptable degree of hydration occurs, even in relatively cold water. This can provide a method whereby salt can be economically leached from the plaster being supplied to a continuous manufacturing process, without undue hydration of the plaster prior to the time at which hydration is required in the manufacture of a set product.

According to the invention, a continuous supply of salt-bearing gypsum plaster is rapidly and intimately mixed with a flow of relatively cold water, more especially at a temperature in the range of 0° to 40° C and, after a time (hereinafter called the 'residence time') too short for unacceptable hydration of the plaster to occur, a substantial proportion of the water containing dissolved salt is continuously separated from the plaster and the damp or wet plaster is conveyed to the future stages of the manufacturing process. By adjustment of the degree of separation of the water from the plaster it can be contrived that the damp plaster contains just that proportion of water that is required in a gauged plaster for the manufacturing purpose involved. Alternatively, a higher degree of separation may be achieved, with consequential removal of a higher proportion of the salt content, and the desired gauging water level made up with pure water before utilization of the plaster.

One preferred construction of the mixing zone has a vortical form, in which the water is caused to flow down the internal wall surface of an inverted hollow cone while plaster is fed onto an upright smaller cone, the falling plaster being thereby deflected and distributed over the internal surface of the latter. By this means the plaster can be instantly and intimately mixed with the water, and the vortical mixer can be mounted directly over the continuous separator.

Other forms of continuous mixer with low residence times can be used, for example, a rotary mixer in which the plaster falls onto the upper, preferably conical, surface of a high speed rotor when it meets a continuous supply of water and is discharged centrifugally as a slurry.

The ratio by weight of washing water to plaster can be varied over a wide range, depending on the relative capacities of the mixer and separator, ratios in the range 1:1 to 5:1 being at present preferred.

The continuous separator must be capable of handling relatively large volumes of water and of separating the bulk solid plaster without significant hydration of the latter. To achieve this latter goal it is important that the separator should not permit the retention of minor quantities of plaster which may set in the separator and either be intermittently released as lumps or eventually cause the separator to become inoperable.

In accordance with a first embodiment of the invention, the preferred device used for the continuous separation of water and plaster is a continuous decanting centrifuge. However, unlike most materials dewatered through such apparatus, plaster disperses and hydrates when brought into contact with water. It is therefore essential to prevent plaster from remaining in the centrifuge for more than a few seconds. Hydration makes the plaster useless for plasterboard manufacture and also leads to retention of solids in the centrifuge, thus allowing hydration to proceed still further.

The preferred centrifuge is therefore constructed to avoid these difficulties. It seeks to achieve plug flow of the contents of the centrifuge and achieves this by one or more of the following novel features.

According to one preferred feature, the helix or scroll of the centrifuge fits closely or extends close to the surface of the rotary casing or bowl over its entire length. This ensures that there are no unswept portions of the surface in which hydrating plaster can accumulate.

According to a further feature, the rotary centrifuge casing has a straight conical profile without a change from a parallel to a tapering section such as characterizes most convential centrifuges. This avoids the separated solids having to change direction in moving along the centrifuge wall and thus prevents a build-up of plaster solids in an initial parallel section, where premature hydration might occur.

According to yet another feature, the conical wall of the rotary casing has an angle of inclination to the axis of the centrifuge which does not exceed a maximum determined for the particular solids being handled. This avoids delay in passage of the separated solids which in the case of plaster could result in at least partial hydration within the centrifuge, and discharge as set lumps.

The use of a continuous centrifugal separator avoids the problem of blocking or filter media by a cementitious solid such as plaster, which may arise if certain types of filtration equipment are adopted for the separator.

The used water can be recycled to treat further plaster, with provision being made for a supply of pure feed or make-up water and for withdrawal as waste effulent of a proportion of the used water, so as to prevent the build-up of salt concentration in the water to an undesirable level.

To obtain the aforementioned advantages, the water employed should preferably have a temperature in the range 0° to 40° C., and more especially in the range 0° to 30° C. It may conveniently be at ambient temperature, in which case a residence time of less than 30 seconds is desirable and 10–15 seconds is a typical range. If warmer water is employed, the residence time can be longer, but this advantage is offset by the additional cost of heating the water. Similarly, the permissible residence time can be longer, but this advantage is offset by the additional cost of heating the water. Similarly, the permissible residence time can be lengthened by adding a setting retarder but again there will be increased cost and inconvenience.

BRIEF DESCRIPTION OF THE DRAWINGS

The invention will be further described, by way of example, with reference to the accompanying drawings in which.

DETAILED DESCRIPTION OF THE INVENTION

Figure 1:
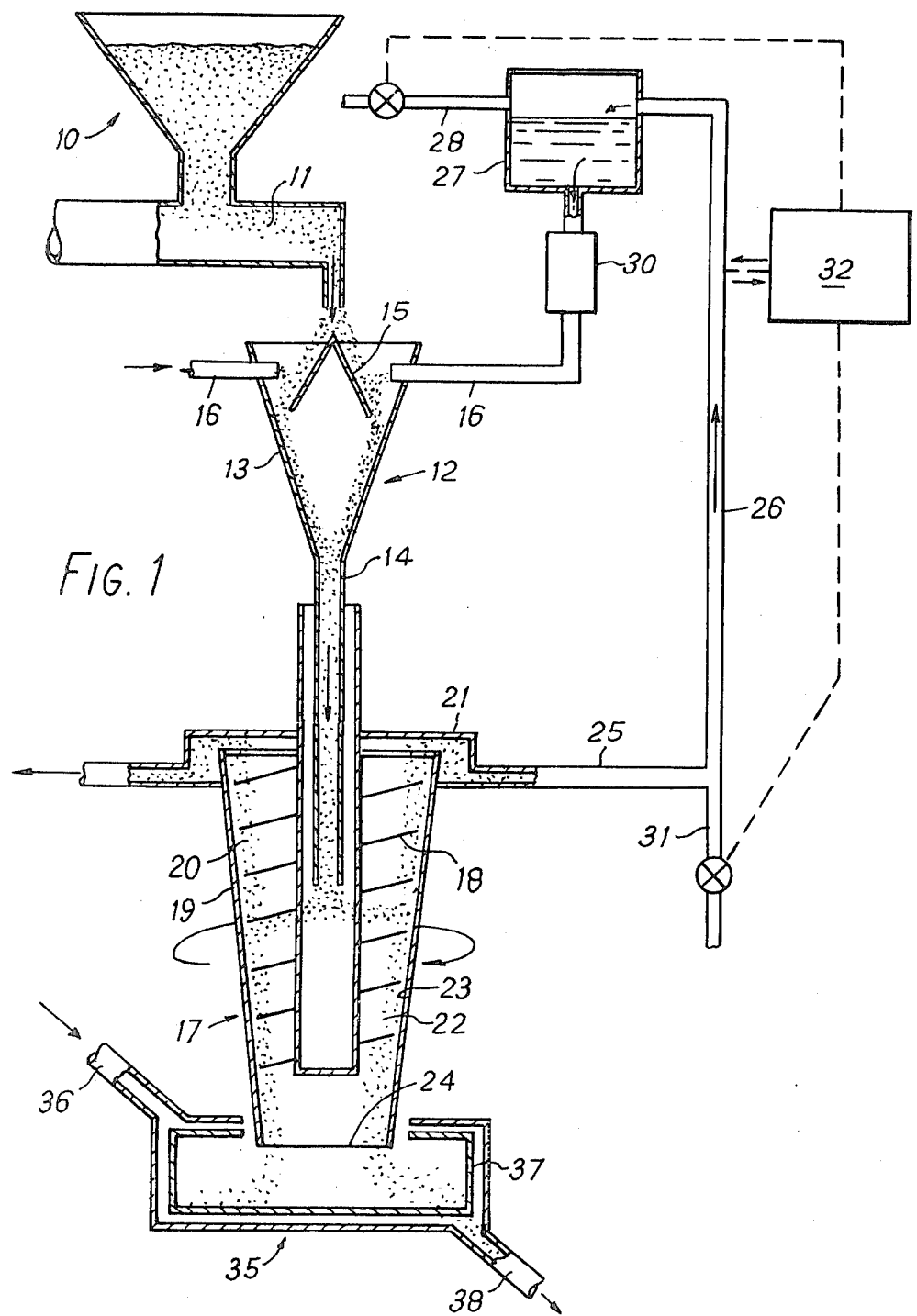
FIG. 1 is a schematic diagram of one example of an apparatus for carrying out the invention.

The various examples of apparatus shown in the drawings are arranged to discharge gauged plaster to a gypsum board machine, which may be of a conventional kind and is accordingly not shown in the drawing.

The apparatus shown in FIG. 1 includes a hopper and screw feeder 10 which supplies powdered gypsum plaster 11 to a vortical premixer 12. The premixer includes an outer inverted conical wall 13 with a bottom outlet 14 and an upright dispersing cone 15 disposed within the inverted cone. Water inlets 16 at the upper end of the conical wall 13 maintain a tangential supply of water, which flows in a thin film down the inner surface of the wall 13. Plaster falling on the dispersing cone 15 is thus brought into rapid and intimate admixture with the flowing water.

The outlet 14 leads directly into a continuous decanting centrifuge 17 in which the mixture of plaster and water is directed by the rotary helix 18 to the internal surface of the rotary outer case 19 of the centrifuge. Separated water 20, containing a substantial proportion of the salt content of the original plaster, leave the centrifuge at the overflow 21, and wet plaster 22 with a reduced water content moves along the inclined surface 23 of the centrifuge and emerges at the solids outlet 24.

The water content of the plaster slurry delivered at the outlet 24 is determined by the peripheral speed of the outer case 19 and can be adjusted accordingly to a desired value. The throughput of plaster slurry is controlled by the relative peripheral speeds of the helix 18 and the outer case 19.

The plaster leaving the centrifuge may have a water content appropriate for the manufacture of gypsum board, but if desired the water content may be reduced below the desired level, for example to increase the proportion of salt removed, in which case the damp plaster is mixed with further water to make good the deficiency before the slurry is deposited in the board machine.

Provision for this is illustrated in the FIG. 1, where an Erhsam mixer 35 of known construction is mounted immediately below the centrifuge outlet 24 to receive the damp plaster directly from it. The mixer 35 has an inlet 36 for the admission of additional gauging water, which may be accompanied by additives necessary or desirable in the manufacture of the product concerned. Thus in the case of plaster board there may be added at this stage setting time adjustment agents, starch and foam which are mixed with the damp plaster with the help of rotary scrapers 37. The outlet 38 of the mixer 24 then leads directly to the board machine.

Contaminated water leaving the centrifuge by the overflow 21 can be recycled through lines 25 and 26 to a holding tank 27 which is fitted also with an inlet 28 for clean water. Water from the tank 27 is pumped by means of a pump 30 to the inlets 16 of the premixer. A branch outlet 31 enables contaminated water to be bled off from the system and the removal of contaminated water and the admission of clean water can be controlled automatically by a salt level monitor 32 operating valves at the inlet 28 and outlet 31.

By way of example, apparatus of this kind can be operated with weight ratios of water to plaster of 1:1 to 5:1 or more and the decanting centrifuge may divide the mix of water and plaster into wet plaster and excess water in similar ratios.

A typical residence time of the plaster in the apparatus between the premixer cone 15 and the outlet 24 should be about 10 seconds, which minimizes the risk of substantial rehydration during the leaching process.

By way of example, use of the apparatus shown can remove some 50% of the salt originally present, which ensures that plaster prepared from various natural gypsum sources can be employed in the manufacture of gypsum board.

Although the apparatus shown in FIG. 1 employs a vertically mounted counter or divided current decanting centrifuge, a horizontally mounted centrifuge or a co-current centrifuge can readily be substituted.

Figure 2:
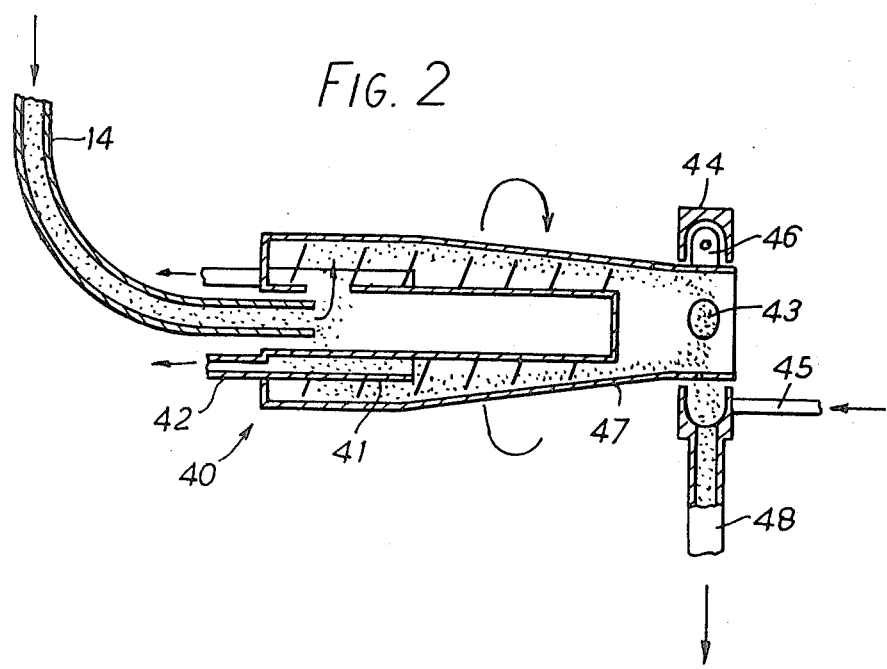
FIG. 2 illustrates a modified form of the apparatus of FIG. 1.

In the modification shown in FIG. 2, the outlet 14 from the vertical mixer (shown in FIG. 1) leads to a horizontally mounted co-current centrifuge 40. The mixture of plaster and water is introduced at the inlet end of the centrifuge and both components flow in the same direction until the separated water is removed over the overflow 41 to emerge through the water outlets 42 while the wet plaster emerges through outlet orifices 43 into a discharge ring 44. In the latter it is mixed with any necessary further water and additives introduced through an inlet 45 and advanced by scraper elements 46 which are mounted on the rotary casing 47 of the centrifuge and rotate with it. The fully gauged plaster emerges through an outlet 48.

Figure 3:
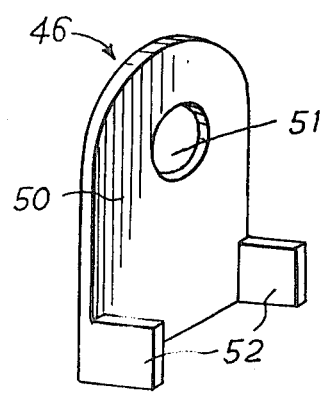
FIG. 3 shows a detail of the apparatus of FIG. 2.

The preferred form of scraper 46 is shown on a larger scale in FIG. 3 and comprises a plate 50 shaped to correspond with the cross-section opening 51 to prevent excessive back pressure and forwardly projecting side shields 52 adjacent to the casing 47 (FIG. 2) of the centrifuge. The shields 52 serve to prevent the escape of plaster slurry through the clearance between the discharge ring wall and the casing 47. An alternative sealing system may employ a pair of annular flanges mounted on the casing 47 in respective positions close to the side walls of the channel in the discharge ring. In this case the scraper 46 does not require the shields 52 but should be cut away in the corresponding positions to accomodate the flanges.

Figure 4:
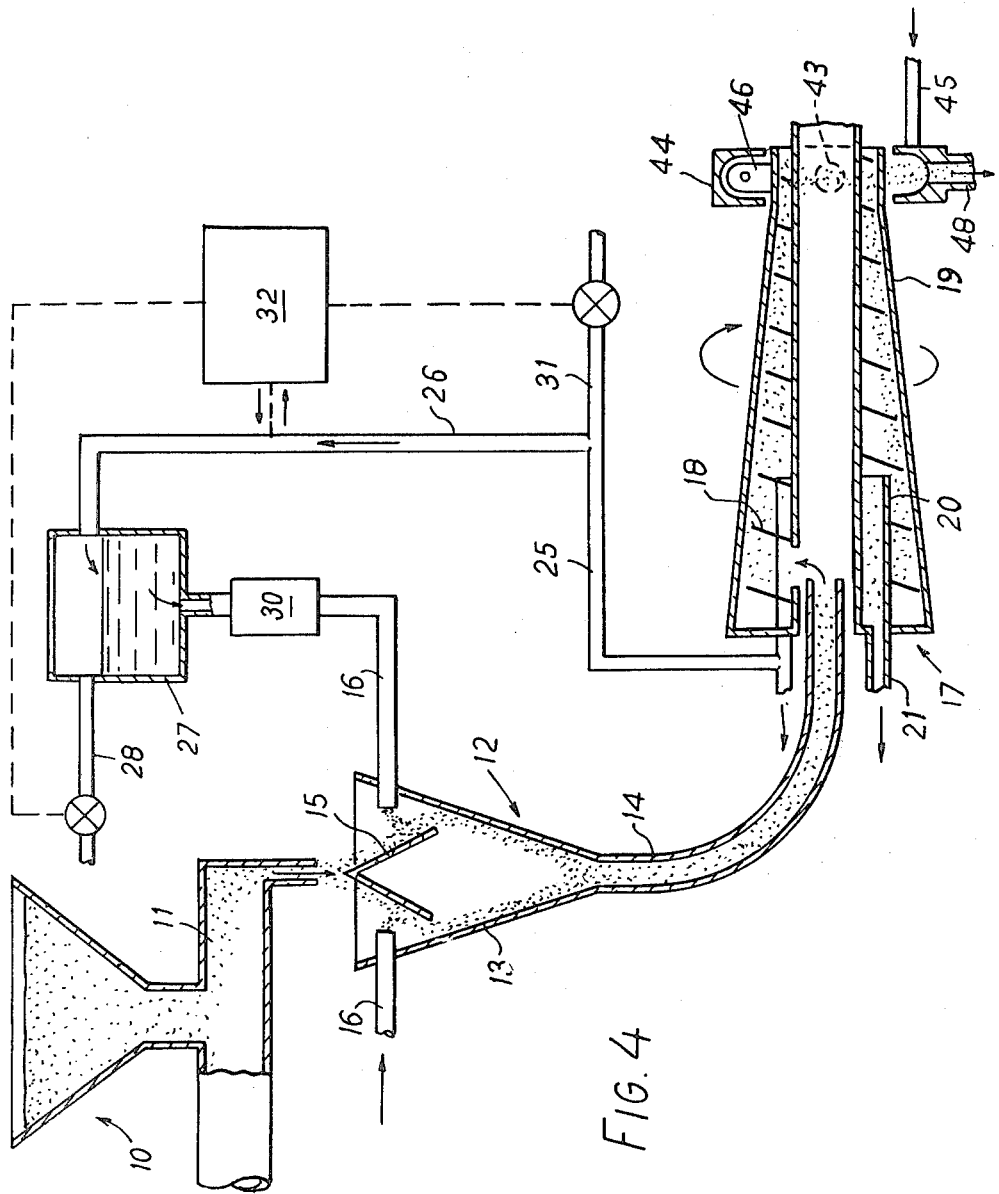
FIG. 4 is a schematic diagram of another form of apparatus for carrying out the invention.

The apparatus shown in FIG. 4 includes a hopper and screw feeder 10 and a vortical premixer 12 with a bottom outlet 14 as already described with reference to FIG. 1. The casing or bowl 19 of the continuous decanting centrifuge 17 is of uniformly conical section throughout, apart from a short parallel section at the discharge end, which poses no obstacle to the passage of solids, and its surface is swept over its whole area by the helix or scroll 18. The angle of a slope of the conical surface of the casing 19 is preferably less than 7° for common grades of hemi-hydrate gypsum plaster, and this limit is critical for a given material, but may be found to vary with particular materials being handled.

The separated water leaves the centrifuge by an overflow 20 and passes to the outlet 21 while wet plaster with a reduced water content emerges at the opposite end of the centrifuge bowl.

Provision may be made for recycling the washing water, as described with reference to FIG. 1. The solids outlet may be provided with a discharge ring and scrapers as described with reference to FIGS. 2 and 3.

I claim:

1. A method of removing salt from gypsum plaster supplied to a manufacturing process for the production of set gypsum products which comprises rapidly and continuously mixing a continuous supply of dry salt-bearing gypsum plaster with a flow of water having a temperature below the hydration transition temperature of gypsum at which rapid hydration of gypsum plaster can occur and continuously separating a substantial portion of the water containing dissolved salt from the plaster, the time elapsing between mixing of the plaster with water and separating a substantial proportion of the water being less than 30 seconds thereby ensuring that unacceptable hydration does not occur, and conveying the damp or wet plaster to the manufacturing process.

2. A method of removing salt from gypsum plaster supplied to a manufacturing process for the production of set gypsum products which comprises rapidly and continuously mixing a continuous supply of dry salt-bearing gypsum plaster with a flow of water having a temperature of 0° to 40° C., continuously separating a substantial portion of the water containing dissolved salt from the plaster by continuous separation, the time elapsing between mixing of the plaster with water and separation of a substantial proportion of the water not exceeding 30 seconds, and conveying the damp or wet plaster free from a substantial amount of salt to the manufacturing process.

3. The method of claim 2 wherein the water is at a temperature of 0° to 30° C.

4. The method of claim 2 in which the weight ratio of the flow of water to the supply of plaster is from 1:1 to 5:1.

5. The method of claim 2 in which the water is separated from the plaster by continuous centrifugal separation.

6. The method of claim 1, wherein the separation is effected in a period of time up to 15 seconds.

* * * * *